United States Patent [19]

Feldman

[11] Patent Number: 5,305,074
[45] Date of Patent: Apr. 19, 1994

[54] ACHROMATIC SELF-REFERENCING INTERFEROMETER

[75] Inventor: Mark Feldman, Pleasanton, Calif.

[73] Assignee: The United States of America as represented by the United States Department of Energy, Washington, D.C.

[21] Appl. No.: 914,345

[22] Filed: Jul. 17, 1992

[51] Int. Cl.$^5$ ............................................. G01B 9/02
[52] U.S. Cl. .................................... 356/345; 356/353
[58] Field of Search ........................ 356/345, 353, 359

[56] References Cited

U.S. PATENT DOCUMENTS

| | | | |
|---|---|---|---|
| 4,025,195 | 5/1977 | Ebersole et al. | 356/345 X |
| 4,030,831 | 6/1977 | Gowrinathan | 356/351 X |
| 4,118,124 | 10/1978 | Matsuda | 356/107 |
| 4,558,952 | 12/1985 | Kulesh et al. | 356/349 |
| 4,575,248 | 3/1986 | Horwitz et al. | 356/353 |
| 4,653,921 | 3/1987 | Kwon | 356/353 |
| 4,767,210 | 8/1988 | Kashyap | 356/345 |
| 4,872,755 | 10/1989 | Küchel | 356/360 |
| 5,004,346 | 4/1991 | Kühel | 356/360 |

OTHER PUBLICATIONS

Chen et al, Holographic Twyman-Green Interferometer, Applied Optics, vol. 24, No. 6 / 15 Mar. 1985.
Ono et al, Aspherical Mirror Testing Using a OGH With Small Errors, Applied Optics, vol. 24, No. 4 / 15 Feb. 1985.
M. Feldman, D. J. Mockler, R. E. English Jr., J. L. Byrd, and J. T. Salmon, "Self-referencing Mach-Zehnder Interferometer As A Laser System Diagnostic", Active and Adaptive Optical Systems, Mark A. Ealey, Editor, Proc. SPIE 1542, pp. 490-501 (1991).

Primary Examiner—James C. Housel
Assistant Examiner—Harold Y. Pyon
Attorney, Agent, or Firm—Miguel A. Valdes; Roger S. Gaither; William R. Moser

[57] ABSTRACT

A self-referencing Mach-Zehnder interferometer for accurately measuring laser wavefronts over a broad wavelength range (for example, 600 nm to 900 nm). The apparatus directs a reference portion of an input beam to a reference arm and a measurement portion of the input beam to a measurement arm, recombines the output beams from the reference and measurement arms, and registers the resulting interference pattern ("first" interferogram) at a first detector. Optionally, subportions of the measurement portion are diverted to second and third detectors, which respectively register intensity and interferogram signals which can be processed to reduce the first interferogram's sensitivity to input noise. The reference arm includes a spatial filter producing a high quality spherical beam from the reference portion, a tilted wedge plate compensating for off-axis aberrations in the spatial filter output, and mirror collimating the radiation transmitted through the tilted wedge plate. The apparatus includes a thermally and mechanically stable baseplate which supports all reference arm optics, or at least the spatial filter, tilted wedge plate, and the collimator. The tilted wedge plate is mounted adjustably with respect to the spatial filter and collimator, so that it can be maintained in an orientation in which it does not introduce significant wave front errors into the beam propagating through the reference arm. The apparatus is polarization insensitive and has an equal path length configuration enabling measurement of radiation from broadband as well as closely spaced laser line sources.

26 Claims, 2 Drawing Sheets

ACHROMATIC SELF-REFERENCING INTERFEROMETER

THE UNITED STATES GOVERNMENT HAS RIGHTS IN THIS INVENTION PURSUANT TO CONTRACT NO. W-7405-ENG-48 BETWEEN THE UNITED STATES DEPARTMENT OF ENERGY AND THE UNIVERSITY OF CALIFORNIA FOR THE OPERATION OF LAWRENCE LIVERMORE NATIONAL LABORATORY.

FIELD OF THE INVENTION

The invention pertains to an optical interferometer capable of accurately measuring laser wavefronts over a broad range of wavelengths. More particularly, the invention pertains to a self-referencing Mach-Zehnder interferometer capable of accurately measuring laser wavefronts over a broad range of wavelengths.

BACKGROUND OF THE INVENTION

One conventional type of interferometer, known as a "Mach-Zehnder interferometer," includes an input beamsplitter which divides the amplitude of an incoming wavefront into a reference beam and a measurement beam. The reference beam propagates through a reference arm of the apparatus, the measurement beam propagates through a measurement arm of the apparatus, and the two beams are recombined at an output beamsplitter. Fringes of the recombined beam are observed to reveal optical path differences between the reference and measurement arms (for example, at times when a gas flow, flame, or other object of interest is positioned in the path of the measurement beam along the measurement arm).

When the object of interest is the input laser beam itself, the reference arm can include a means for spatially filtering the reference portion of the input beam to produce a high quality spherical wave. The spherical wave is then collimated, and finally recombined with the "measurement" portion of the input beam. Since the reference wavefront is produced from the beam under test, this conventional type of Mach-Zehnder interferometer is known as a "self-referencing Mach-Zehnder interferometer" (or "SRMZ").

It would be desirable to design an SRMZ to be capable of extremely accurate wavefront measurements (for example, measurements with accuracy of at least L/10 peak-to-valley, where L is the input beam wavelength) over a broad range of input beam wavelengths (for example, over at least a 300 nm wavelength range), without the need to readjust any optical components. It would also be desirable to design such an SRMZ to be polarization insensitive, and to be capable of accurate wavefront measurements on radiation from broadband sources as well as closely spaced laser line sources. However, until the present invention, it was not known how to design an SRMZ having the features mentioned in this paragraph.

SUMMARY OF THE INVENTION

The invention is a self-referencing Mach-Zehnder interferometer which is achromatic in the sense that it is capable of accurately measuring laser wavefronts over a broad wavelength range (for example, from about 600 nm to about 900 nm). The inventive apparatus includes an input beamsplitter which directs a reference portion of an input beam to a reference arm (i.e., to optical elements which comprise a reference arm), and a measurement portion of the input beam to a measurement arm. A second beamsplitter recombines portions of the output beams from the reference and measurement arms, and the resulting interference pattern (sometimes denoted as a "first interferogram") is registered by a first detector (which is preferably a camera which records the first interferogram).

Optionally, a subportion of the measurement portion is diverted to a second detector (which can be a camera), which registers an intensity signal, and portions of the output beams from the reference and measurement arms portions are combined and diverted to a third detector (which can also be a camera) which registers a complementary interferogram. The outputs of the second and third detectors can be processed to normalize the first interferogram, or otherwise reduce the first interferogram's sensitivity to input noise.

The reference arm includes a spatial filter for producing a high quality spherical beam from the reference portion, a tilted wedge plate for compensating for off-axis aberrations in the output of the spatial filter, and a collimating mirror which collimates the radiation transmitted through the tilted wedge plate. The collimating mirror is preferably oriented to receive the spherical beam (after it has propagated through the tilted wedge plate) at a low incidence angle.

In a class of preferred embodiments, the invention includes a baseplate made of thermally and mechanically stable material (such as an Invar or Super-Invar alloy) which supports all the reference arm optics, or at least the spatial filter, tilted wedge plate, and the collimator of the reference arm.

The tilted wedge plate is preferably mounted adjustably with respect to the spatial filter and collimator, so that it can be maintained in an orientation in which it does not introduce significant wavefront errors into the beam propagating through the reference arm. For example, the wedge plate can be a glass wedge mounted on a three-point mount having three pairs of ball bearings, so that the ball bearing pairs can be manipulated to reorient the wedge plate without significantly stressing the glass.

In preferred embodiments, the interferometer of the invention is polarization insensitive, because its beamsplitters are all oriented to receive radiation at low incidence angles, and has an equal path length configuration enabling measurement of radiation from broadband sources as well as closely spaced laser line sources.

The invention is useful in laser isotope separation plants, in optical testing laboratories, and in other research and commercial applications which would benefit from optical wavefront measurements on multiple wavelength coherent radiation.

DETAILED DESCRIPTION OF THE PREFERRED EMBODIMENT

Figure 1:
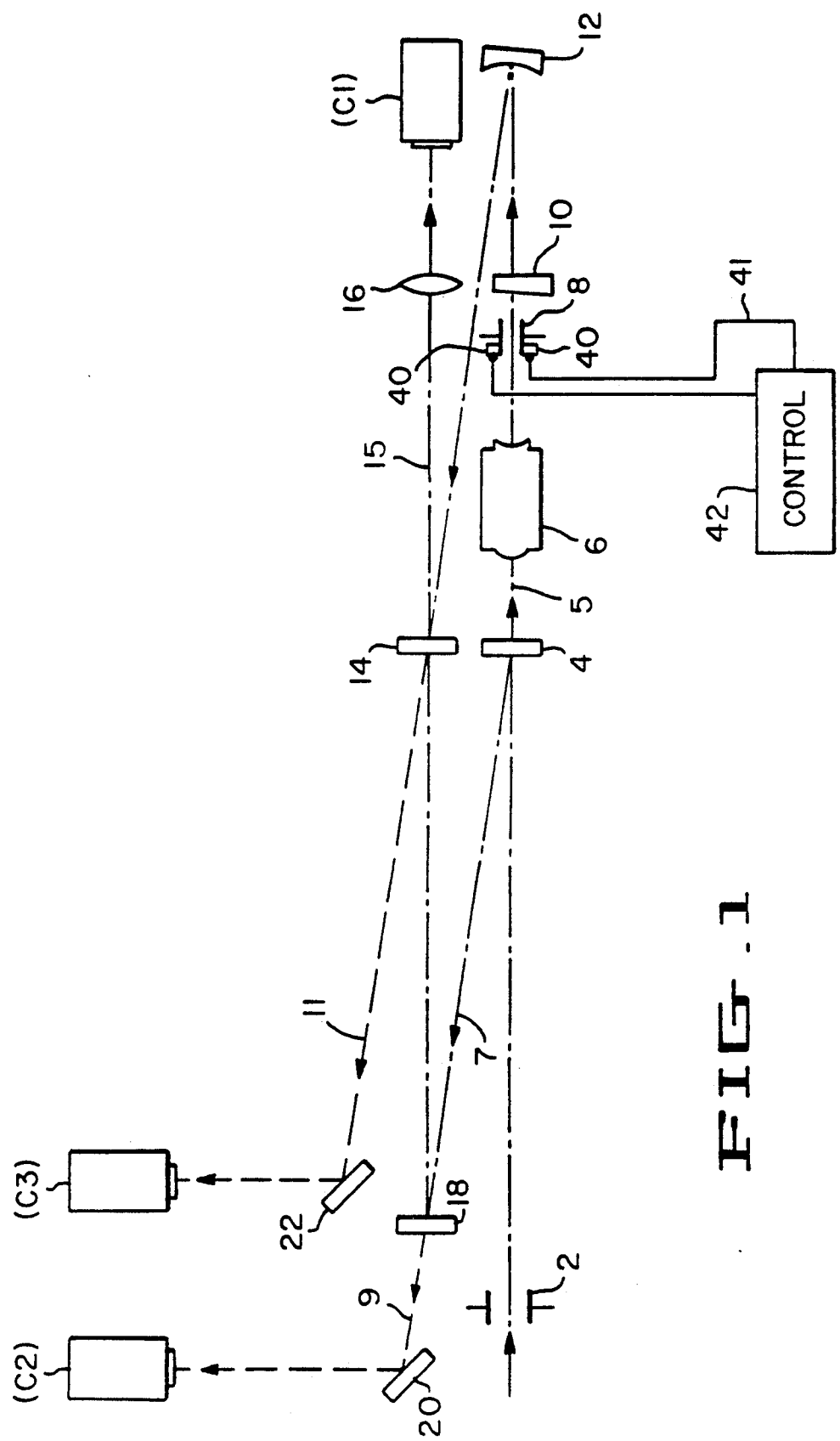
FIG. 1 is a simplified schematic diagram of a preferred embodiment of the invention.

FIG. 1 is a simplified schematic diagram of a preferred embodiment the invention. The input laser beam propagates through input aperture 2, and is then partially transmitted through, and partially reflected from, input beamsplitter 4. During set-up and calibration of the FIG. 1 apparatus, a collimated laser beam from a thermally and mechanically stable wavefront reference source is preferably employed as the input beam. Input beamsplitter 4 directs a reference portion 5 of the input beam to the spatial filter comprised of pinhole lens 6 and pinhole 8, tilted wedge plate 10, and collimating mirror 12 (elements 6, 8, 10, and 12 comprise the reference arm of the apparatus). Input beamsplitter 4 also directs a measurement portion 7 of the input beam to a measurement arm (which includes mirror 18).

Recombination beamsplitter 14 recombines portions of the output beams from the reference and measurement arms to produced combined beam 15, and combined beam 15 is focused by lens 16 and projected on detector C1 (which is preferably a camera). Detector C1 registers the resulting interference pattern as a "first-"interferogram.

Optionally, the measurement arm of the FIG. 1 apparatus also includes second and third detectors C2 and C3 (which can be cameras) and mirrors 20 and 22. In this embodiment, mirror 18 is partially transmissive so that a portion 9 of measurement portion 7 is transmitted through mirror 18 to mirror 20. Detector C2 registers an intensity signal indicative of the intensity of the radiation reflected from mirror 20.

Also in this embodiment, beamsplitter 14 combines portions of the output beams from the reference and measurement arms to produce a combined beam 11. Combined beam 11 reflects from mirror 22 and is incident at detector C3. As a result, detector C3 registers a second interferogram which is complementary to the first interferogram registered by detector C1.

The intensity signal asserted at the output of detector C2 and the second interferogram asserted at the output of detector C3 can be processed to normalize the first interferogram (registered by detector C1), or to otherwise reduce the first interferogram's sensitivity to input noise. For example, the first interferogram can be normalized on a pixel by pixel basis by dividing it by the intensity signal from detector C2. In another example, the second interferogram is subtracted from the first interferogram, and the resulting difference is normalized on a pixel by pixel basis by dividing it by the intensity signal from detector C2.

For illustrative purposes, the subsequent description of FIG. 1 will assume that the apparatus has been designed and aligned for optimum performance with a collimated input beam having 633 nm wavelength cross-section of 4 mm×8 mm. The apparatus can alternatively be designed and aligned for optimum performance with an input beam having a different wavelength or cross-section (such as a Gaussian cross-section). In this embodiment, the SRMZ of the invention is capable of extremely accurate wavefront measurements (with accuracy of L/10, peak-to-valley, or better, where L is the input beam wavelength) over a broad input beam wavelength range of 300 nm or more, without the need to readjust any of the system's optical components.

As shown in FIG. 1, the reference arm includes a spatial filter (comprised of pinhole lens 6 and pinhole 8) for producing a high quality spherical beam from reference beam 5. Lens 6 focuses beam 5 onto pinhole 8, and is preferably a compact, two-element telephoto lens (a commercial achromat and bioconcave singlet having focal lengths +48 mm and −12 mm) with fixed element spacing (35 mm) and effective focal length of 200 mm. Pinhole 8 preferably has a 15 micron diameter for an input beam of the above-mentioned type (having a rectangular cross-section of 4 mm×8 mm). The optimal pinhole diameter depends on the f-number (the ratio of focal length to diameter) of the pinhole lens 6 and on the input beam cross-section. Lens 6 produces a diffraction pattern whose central lobe (for an unaberrated input beam at the shortest wavelength and largest input beam dimension) is centered near the center of pinhole 8 (preferably, at the center of pinhole 8) and overfills pinhole 8. Preferably, the degree of overfill is about two (the center lobe diameter is about twice that of the pinhole), to cause a high quality spherical wave to propagate from pinhole 8 to tilted wedge plate 10, while providing adequate transmitted intensity. Preferably, lens 6 is designed so that the incident beam intensity at pinhole 8 does not decrease by more than a factor of two due to longitudinal color.

To measure input beam wavefronts, including absolute focus, without having to calibrate and correct for chromatic aberrations of refractive lenses, the reference arm includes collimating mirror 12. Collimating mirror 12 preferably has focal length equal to about 200 mm and f-number equal to about 22, and is preferably oriented to receive at a low incidence angle the beam to be collimated. If tilted wedge 10 were omitted from the FIG. 1 apparatus, the primary residual aberrations (those not corrected by mirror 12 alone) are astigmatism and coma. If its f-number is 22, collimating mirror 12 is sufficiently slow that spherical aberration is negligible.

An important feature of the invention is the positioning of tilted, wedged transmission plate 10 in the path of the expanding beam between pinhole 8 and collimating mirror 12, for cancelling both coma and astigmatism that would Otherwise result upon reflection of the expanding beam from mirror 12. The wide edge surface of wedge plate 10 lies in the plane of FIG. 2, and wedge plate 10's narrow edge surface (which would lie below the plane of FIG. 2) is indicated in phantom view by reference character 10A. Plate 10 has an apex angle A between its front and back faces (the faces nearest to pinhole 8 and farthest from pinhole 8, respectively), and is mounted a distance D (along the beam path) from pinhole 8. By appropriately choosing an optimal distance D and an optimal apex angle A, "coma" aberrations can be minimized (maximally cancelled). By appropriately choosing an optimal orientation of plate 10 relative to the optical axis (i.e., an optimal rotational orientation of plate 10 about the vertical axis in FIG. 2, sometimes referred to as "tilt angle"), astigmatic aberrations can be minimized (maximally cancelled). The optimal values of distance D, apex angle A, and tilt angle can be determined experimentally, by measuring the magnitude of each type of aberration against the parameter to be optimized, and choosing convenient combinations of the parameters that result in optimal aberration cancellation, in a manner that will be apparent to those of ordinary skill in the art.

In addition to coma and astigmatism, tilted wedge 10 introduces a significant focal shift of the expanding beam from pinhole source 8, and also beam displacement and angular deviation. The inventor has recognized, however, that the sensitivity of all these effects to input beam wavelength and temperature is insignificant over broad wavelength and temperature ranges of interest.

Figure 2:
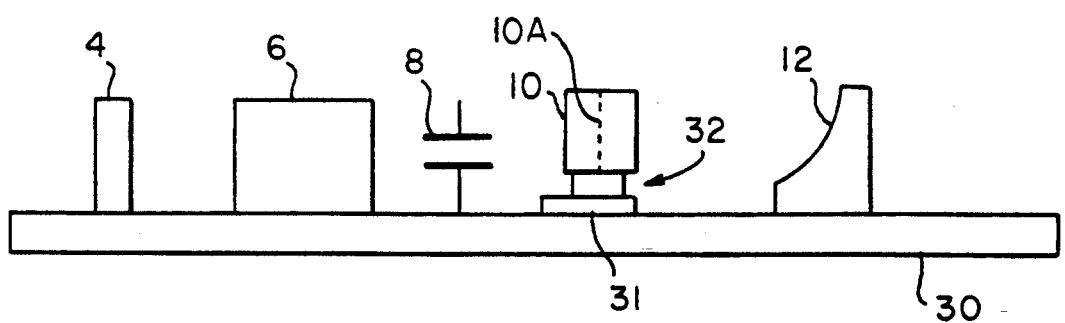
FIG. 2 is a simplified side cross-sectional view of a portion of a second preferred embodiment of the invention.

In a preferred embodiment, in which the SRMZ of FIG. 1 is capable of accurately measuring laser wavefronts over an input laser beam wavelength range from about 600 nm to about 900 nm, plate 10 is a 5.5 mm thick, 11.3 degree, circular BK 7 wedge prism, mounted with its apex axis oriented vertically upward (as shown in FIG. 2), and the center of its front surface at a distance D=61 mm behind pinhole (having 15 micron diameter). Collimating mirror 12 (having focal length equal to 200 mm) is mounted with its center 14.2 mm above the undeviated optical axis, and rotated 0.06 degrees clockwise. Plate 10 is rotated about the optical axis until its astigmatism is correctly oriented, and a final rotation about its vertical axis is performed to cancel the mirror astigmatism (by design, plate 10 is rotated 2.9 degrees counterclockwise with respect to the undeviated optical axis).

In a class of preferred embodiments, the invention includes a baseplate made of thermally and mechanically stable material (such as an Invar or Super-Invar alloy) which supports all the reference arm optics (or at least pinhole element 8, wedge plate 10, and collimating mirror 12). Horizontally oriented baseplate 30 shown in FIG. 2 is an example of such a baseplate, on which all of elements 4, 6, 8, 10, and 12 are mounted. Suitable mounting apparatus for mounting the reference arm elements to the baseplate can be selected from high-quality commercially available mounts. Preferably, a three-point mount (to be described below with reference to FIG. 3) is employed for mounting wedge plate 10 to the baseplate.

Baseplate 30 is preferably made of thermally stable material, such as Invar alloy, Super Invar alloy, or another alloy having thermal properties similar to Invar or Super Invar. Super Invar is a well-known alloy which consists of 64% steel (having 0.2% carbon content) and 36% nickel, and has a coefficient of linear thermal expansion less than about 0.000001 per degree Celsius. Alternatively, baseplate 30 can be made of steel or another mechanically stable material.

Tilted wedge plate 10 should be mounted adjustably with respect to the spatial filter and collimating mirror, so that it can be positioned in an orientation in which it does not introduce significant wave front errors into the beam propagating through the reference arm. In a preferred embodiment, wedge plate 10 is a glass wedge mounted on three-point mounting means 32 (shown schematically in FIG. 2 and described in detail in FIG. 3) which includes mounting plate 31 and means for kinematically mounting plate 10 relative to plate 31. In the preferred embodiment shown in FIG. 3, mounting means 32 enables plate 10 (typically made of glass) to be oriented and reoriented relative to plate 31 without significantly stressing the glass which comprises plate 10.

Figure 3:
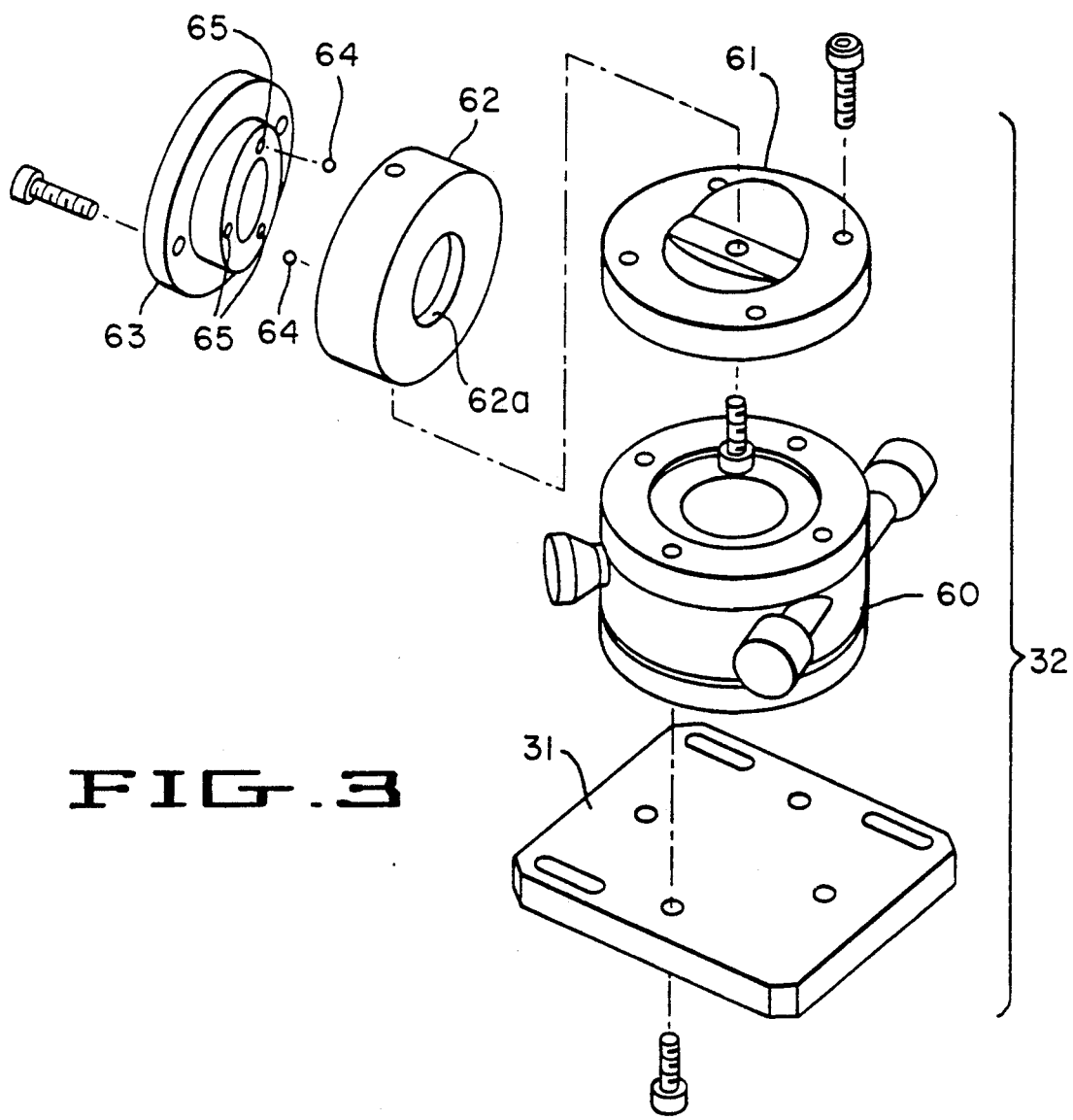
FIG. 3 is an exploded perspective view of a preferred embodiment of the tilted wedge plate, and three-point wedge plate mount, of the invention.

In the preferred embodiment shown in FIG. 3, mounting means 32 includes a mounting plate 31, a wedge plate holder comprising cup 62, cover 63, and six balls 64 (two of which are shown in FIG. 3), and a rotator assembly comprising members 60 and 61. To assemble mounting means 32, three balls 64 (preferably made of steel) are placed in depressions 65 in the inclined surface of cover 63 and three additional balls 64 are placed in opposing depressions in cup 62. Wedge plate 10 (not shown in FIG. 3) is placed against the inclined surface of cover 63 (so that plate 10 rides on the three balls 64 which have been placed in depressions 65). The assembly comprising plate 10, balls 64, and cover 63 is then inserted in cup 62, so that plate 10 is held between the balls 64 in cover 63 and the opposing balls in cup 62, and so that radiation transmitted along the optical axis through plate 10 will propagate out through cup 62's aperture 62a along the optical axis. Plate 10 is then rotated relative to cup 62 (about the optical axis) until plate 10 is in its above-described optimal orientation about the optical axis. Cover 63 is then fixedly attached to cup 62.

The rotator is assembled by fixedly mounting member 60 to plate 31, and kinematically mounting member 61 to member 60. Cup 62 of the assembled wedge plate holder is then mounted to member 61, with the optical axis of plate 10 parallel to the surface of plate 31 (i.e., with the optical axis is perpendicular to the vertical axis in FIG. 3). When the FIG. 3 apparatus is fully assembled, the wedge holder (assembled elements 62, 63, and 64), plate 10 mounted in the wedge holder, and member 61 can be rotated as a unit about an axis normal to the surface of plate 31 (the vertical axis in FIG. 3) relative to member 60 and plate 31, to give plate 10 its optimal tilt angle.

As previously mentioned, the diffraction pattern produced by lens 6 preferably has a central lobe centered at the center of pinhole 8 (and overfills pinhole 8 by a factor of about two). It is desirable to maintain the alignment of the reference beam to keep this central lobe in this preferred alignment. This can be accomplished by providing for closed loop feedback control of the reference beam alignment. For example, one or more sensors (such as sensors 40 in FIG. 1) are mounted near pinhole 8 to measure the alignment of the central lobe relative to the pinhole. The output signals from sensors 40 are provided as feedback signals to alignment control circuitry 42. Control circuitry 42 processes the feedback signals to generate a beam alignment control signal, which is then provided to one of the reference arm elements (or to an external element) for controlling the reference beam alignment so as to correct for alignment errors indicated by the sensor output signals. For example, beam alignment control signal 41 can be provided from control circuitry 42 to an external mirror so as to maintain proper beam alignment relative to pinhole 8.

In designing an SRMZ in accordance with the invention, it is desirable to compensate for variations (resulting from variations in input beam wavelength and input beam aberration) in the intensity of radiation transmitted through pinhole 8, so as to maintain approximately equal intensity in the outputs of the reference and measurement arms. Even with perfectly achromatic optics, diffraction at overfilled pinhole 8 will scale as $(E_L)L^{-4}$, where L represents input beam wavelength, and the factor $E_L$ (which has order unity) compensates for more uniform pinhole illumination at longer wavelengths. To maintain fringe visibility over the input wavelength band, pinhole lens 6 could be chosen so that its longitudinal color scales as a positive power of L. In this case, the spacing between lens 6 and pinhole 8 would be intentionally offset to smooth the transmission curve over the input wavelength band. However, this smoothing of the curve would have the undesirable effect of reducing the reference arm transmission at short wavelengths. Alternatively, higher throughput could be maintained by using an achromatic focusing lens 6 and tapering the reflectivity of input beam splitter 4 to compensate for the above-mentioned $(E_L)L^{-4}$ losses.

In preferred embodiments, the interferometer of the invention is polarization insensitive, because its beamsplitters are all oriented to receive radiation at low incidence angles. Also preferably, the optical path lengths in the reference and measurement arms are equalized by appropriately adjusting the location of mirror 18. For laser sources with bandwidths as large as 10 GHz, the path lengths need to be equal only to within 1 mm for good fringe visibility. For broader sources, dispersion in pinhole lens 6 and wedge plate 10 can be compensated by adding a dispersive window in the measurement arm.

Various modifications and alterations in the structure and method of operation of the inventive apparatus will be apparent to those skilled in the art without departing from the scope and spirit of this invention. Although the invention has been described in connection with a specific preferred embodiment, it should be understood that the invention as claimed should not be unduly limited to such specific embodiment.

What is claimed is:

1. An achromatic self-referencing Mach-Zehnder interferometer for measuring wavefronts of an input beam, including:
   a reference arm, including a transmissive wedge plate for compensating for off-axis aberrations in a reference beam as the reference beam propagates along the reference arm through the wedge plate;
   a measurement arm along which a measurement beam propagates;
   an input beamsplitter positioned for directing a portion of the input beam to the reference arm as said reference beam, and a second portion of the input beam to the measurement arm as said measurement beam;
   a recombining beamsplitter positioned for producing a recombined beam by recombining collimated reference beam radiation from the reference arm with measurement beam radiation from the measurement arm; and
   a detector for registering a first interferogram indicative of the recombined beam.

2. The interferometer of claim 1, wherein the input beam includes components having wavelength within a wavelength range spanning at least 300 nanometers, and wherein the wedge plate cancels the off-axis aberrations to a sufficient degree so that the interferometer is capable of accurately measuring wavefronts of the input beam over said wavelength range.

3. The interferometer of claim 2, wherein the wavelength range extends from 600 nanometers to 900 nanometers.

4. The interferometer of claim 1, wherein the reference arm also includes:
   a spatial filter for generating a spherical wave from the reference beam, and directing the spherical wave to the wedge plate; and
   a collimating mirror for generating a collimated beam from the spherical wave after said spherical wave has propagated through the wedge plate, and directing the collimated beam to the recombining beamsplitter.

5. The interferometer of claim 4, wherein the wedge plate cancels astigmatism and coma introduced into the spherical wave upon reflection from the collimating mirror.

6. The interferometer of claim 5, wherein the collimating mirror is sufficiently slow that it introduces negligible spherical aberration into the spherical wave, as the spherical wave undergoes reflection from the collimating mirror.

7. The interferometer of claim 4, wherein the spatial filter includes a pinhole element defining a pinhole aperture, the wedge plate has an apex angle, the wedge plate is positioned at a first distance from the pinhole aperture, and the apex angle and the first distance are selected so that the wedge plate cancels coma introduced into the spherical wave upon reflection from the collimating mirror.

8. The interferometer of claim 4, wherein the spherical wave propagates along a beam axis from the spatial filter to the collimating mirror, the wedge plate has a front surface facing the spatial filter, the wedge plate is positioned with the front surface oriented at a tilt angle to the beam axis, and the tilt angle is selected so that the wedge plate cancels astigmatism introduced into the spherical wave upon reflection from the collimating mirror.

9. The interferometer of claim 4, wherein the spatial filter includes:
   a pinhole element defining a pinhole aperture; and
   a pinhole lens for receiving the reference beam and focusing the reference beam to project a diffraction pattern on the pinhole element, wherein the diffraction pattern has a central lobe which overfills the pinhole aperture.

10. The interferometer of claim 9, wherein the pinhole aperture has a first diameter, and wherein the center lobe has a second diameter substantially equal to twice the first diameter.

11. The interferometer of claim 9, wherein the pinhole aperture has a center point, and also including:
   a means for maintaining the diffraction pattern in an alignment with respect to the pinhole element such that the central lobe is centered at the center point of the pinhole aperture.

12. The interferometer of claim 1, wherein the recombining beamsplitter also produces a complementary recombined beam by recombining collimated reference beam radiation from the reference arm with measurement beam radiation from the measurement arm, and wherein the interferometer also includes:
   a second detector for registering a second interferogram indicative of the complementary recombined beam.

13. The interferometer of claim 12, also including:
   a third detector for registering an intensity signal indicative of intensity of the measurement beam.

14. The interferometer of claim 1, also including:
   a second detector for registering an intensity signal indicative of intensity of the measurement beam.

15. The interferometer of claim 4, wherein the collimating mirror is oriented to receive the spherical wave at a low incidence angle.

16. An achromatic self-referencing Mach-Zehnder interferometer for measuring wavefronts of an input beam, including:
   a reference arm, including reference arm optics mounted on a unitary baseplate along a reference beam axis, said reference arm optics including a transmissive wedge plate for compensating for off-axis aberrations in a reference beam as said reference beam propagates along the reference beam axis through the wedge plate;

a measurement arm through which a measurement beam propagates;

an input beamsplitter positioned for directing a portion of the input beam to the reference arm optics as said reference beam, and a second portion of the input beam to the measurement arm as said measurement beam;

a recombining beamsplitter positioned for producing a recombined beam by recombining collimated reference beam radiation from the reference arm with measurement beam radiation from the measurement arm; and a detector for registering a first interferogram indicative of the recombined beam.

17. The interferometer of claim 16, wherein the reference arm includes a spatial filter for generating a spherical wave from the reference beam, said spatial filter including a pinhole element defining a pinhole aperture, and wherein the reference arm optics also includes:

the pinhole element, wherein the spherical wave propagates from the pinhole aperture to the wedge plate, and wherein said wedge plate is positioned at a first distance from the pinhole aperture; and a collimating mirror for generating a collimated beam from the spherical wave after said spherical wave has propagated through the wedge plate and directing the collimated beam to the recombining beamsplitter.

18. The interferometer of claim 16, wherein the baseplate is made of thermally and mechanically stable material.

19. The interferometer of claim 16, wherein the input beamsplitter is also mounted on the unitary baseplate, and wherein the reference arm optics also includes:

a spatial filter for generating a spherical wave from the reference beam, said spatial filter including a pinhole element defining a pinhole aperture, wherein the spherical wave propagates from the pinhole aperture to the wedge plate; and a collimating mirror for generating a collimated beam from the spherical wave after said spherical wave has propagated through the wedge plate and directing the collimated beam to the recombining beamsplitter.

20. The interferometer of claim 16, also including a three-point mount means for adjustably mounting the wedge plate on the unitary baseplate.

21. The interferometer of claim 16, wherein the input beam includes components having wavelength within a wavelength range spanning at least 300 nanometers, and wherein the wedge plate cancels the off-axis aberrations to a sufficient degree so that the interferometer is capable of accurately measuring wavefronts of the input beam over said wavelength range.

22. The interferometer of claim 21, wherein the wavelength range extends from 600 nanometers to 900 nanometers.

23. The interferometer of claim 16, wherein the reference arm also includes:

a spatial filter for generating a spherical wave from the reference beam, and directing the spherical wave to the wedge plate; and a collimating mirror for generating a collimated beam from the spherical wave after said spherical wave has propagated through the wedge plate, wherein the wedge plate is positioned between the spatial filter and the collimating mirror, wherein the collimating mirror directs the collimated beam to the recombining beamsplitter, and wherein the wedge plate cancels astigmatism and coma introduced into the spherical wave upon reflection from the collimating mirror.

24. The interferometer of claim 23, wherein the collimating mirror is sufficiently slow that it introduces negligible spherical aberration into the spherical wave, as the spherical wave undergoes reflection from the collimating mirror.

25. The interferometer of claim 23, wherein the spatial filter includes a pinhole element defining a pinhole aperture, the wedge plate has an apex angle, the wedge plate is positioned at a first distance from the pinhole aperture, and the apex angle and the first distance are selected so that the wedge plate cancels coma introduced into the spherical wave upon reflection from the collimating mirror.

26. The interferometer of claim 23, wherein the spherical wave propagates along the reference beam axis from the spatial filter to the collimating mirror, the wedge plate has a front surface facing the spatial filter, the wedge plate is positioned with the front surface oriented at a tilt angle to the reference beam axis, and the tilt angle is selected so that the wedge plate cancels astigmatism introduced into the spherical wave upon reflection from the collimating mirror.

* * * * *